June 2, 1964          S. BACK          3,135,407

REMOVABLE CARGO BOX FOR TRUCKS OR TRAILERS

Filed April 23, 1962          2 Sheets-Sheet 1

INVENTOR
SAMUEL BACK

BY~ *Maybee & Legris*

ATTORNEYS

June 2, 1964  S. BACK  3,135,407
REMOVABLE CARGO BOX FOR TRUCKS OR TRAILERS
Filed April 23, 1962  2 Sheets-Sheet 2

INVENTOR
SAMUEL BACK
BY~ *Maybee & Legris*
ATTORNEYS 3,135,407
REMOVABLE CARGO BOX FOR TRUCKS
OR TRAILERS
Samuel Back, 165 Degrassi St., Toronto,
Ontario, Canada
Filed Apr. 23, 1962, Ser. No. 189,559
Claims priority, application Great Britain Feb. 6, 1962
4 Claims. (Cl. 214—515)

This invention relates to removable truck or trailer cargo bodies of the type in which the body is lifted off the chassis of a truck or trailer by means of jacks permanently mounted on the body whereby the chassis may be pulled out from under the body and subsequently backed beneath a second body which is then lowered onto the chassis. The second body may be carted away while the first one is being unloaded and reloaded thus avoiding extensive periods of immobility to the truck and inactivity for the driver.

The object of this invention is to provide adequate support for the jacks at the same time permitting the jacks when in the retracted position to swing upwardly substantially parallel to the underside of the truck body. The object of this invention is achieved by rotatably mounting each jack on bearings secured to a supporting plate which is slidable in guides secured to the frame of the body.

Figure 1:
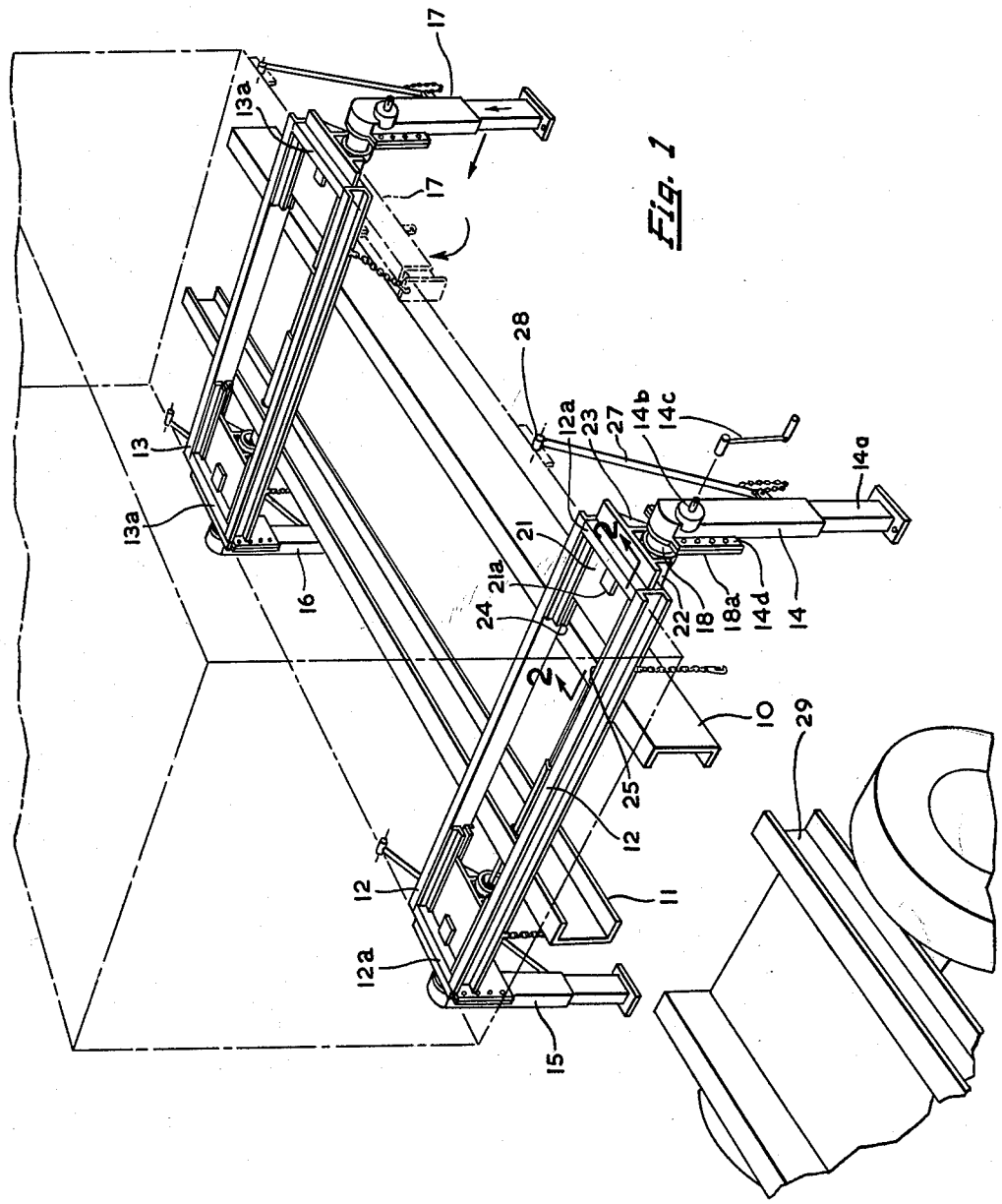
Figure 2:
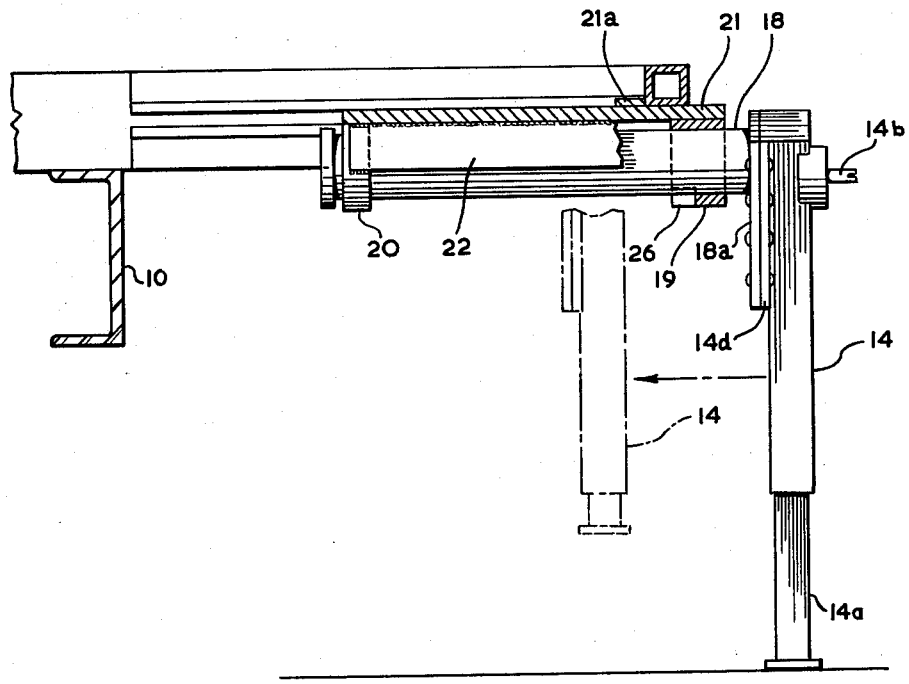

The invention is hereinafter more particularly described and is illustrated in the annexed drawings in which:

FIGURE 1 is a perspective view of the body frame showing the body in phantom lines; and FIGURE 2 is a fragmentary enlarged cross section of the body frame showing a jack in side elevation in body supporting position and in retracted position in phantom lines.

The rectangular body frame comprises two longitudinal frame members 10 and 11 and two pairs of transverse frame members 12 and 13. Each pair of transverse members is connected at each end by cross bars 12a, 12a and 13a, 13a. Four jacks 14, 15, 16 and 17 are mounted on the outer ends of transverse frame members 12 and 13.

These jacks are adapted to slide outwardly to a body supporting position and inwardly to an inactive position where they may be swung up parallel to the underside of the truck body as shown in the case of the jack 17 in phantom lines in FIGURE 1.

Since the mounting of all the jacks is the same, the construction will be described with particular reference to jack 14 which is shown in FIGURE 2. Jack 14 is a standard type automobile jack having an extensible leg 14a which may be extended and contracted by rotating shaft 14b by means of a suitable handle 14c.

Jack 14 is secured to a stub shaft 18 by means of rivets extending through plate 14d on the jack and plate 18a on the stub shaft.

The stub shaft is rotatably mounted in ring bearings 19 and 20 which are secured to the underside of plate 21 by welding or other suitable means. These ring bearings are made more rigid and are reinforced by depending plates 22, 22 which are welded to the underside of plate 21 and to the sides of the ring bearings 19 and 20 and one of which is reinforced by gusset plates 23, 23 one at each end of the plate.

Plate 21 is slidably mounted in spaced apart guide members 24 and 25 which are welded to the inside of the transverse members 12, 12. The guide members each include a lower plate supporting member and an upper plate bearing member spaced from the lower supporting member. The plate 21 will slide in and out in these guide members carrying the jack with it. A lug 21a projecting upwardly from the plate 21 acts as a stop which engages the transverse end member of the transverse frame 12 which limits the outward sliding movement. Inward sliding movement of the plate 21 may be limited by engagement with the frame member 10 or other suitable stop.

To prevent the stub shaft 18 from turning when the jack is in its extended load bearing position a recess is cut in ring bearing 19 to receive a lug 26 welded to stub shaft 18 (see FIGURE 2). There is limited sliding movement of shaft 18 in bearings 19 and 20 sufficient to permit lug 26 to slide into and out of the recess.

To reinforce the jack when in operating position there may be provided a brace 27 pivoted to the underside of the truck body at 28 and provided at its lower end with a hole to receive a pin which extends through a bracket on the side of the jack 14; preferably the pin is attached by a chain to the brace.

When the jack has been slid inwardly out of operating position it may be swung upwardly as shown in FIGURE 1 to a position substantially parallel to the underside of the truck body and secured in the raised position by a chain or other suitable means.

In operation, the jacks, which when not in operation are swung up beneath the truck body, are swung down to a vertical position then pulled out to the position shown in full lines in FIGURES 1 and 2 and are then extended to raise the body off the truck or trailer chassis 29. When the body is raised to the position shown in FIGURE 1 the truck or trailer is driven forward leaving the body supported on the jacks. The body can then be loaded and the same or another truck or trailer backed underneath it, the jacks retracted to permit the frame members 10 and 11 of the body to rest on the frame members of the chasisis truck or trailer. They are then secured in some suitable way and the truck or trailer may then be taken away with the loaded body.

What I claim as my invention is:

1. Means for supporting a body for a truck or trailer, comprising a body frame, guide members secured to the frame and extending substantially parallel to the underside of the frame, supporting plates slidable in the guide members inwardly and outwardly transversely relative to the frame, bearings secured beneath the supporting plates, stub shafts extending inwardly beneath the frame and rotatably mounted in the bearings and slidable therein to a limited extent, a jack secured to the outer end of each stub shaft, whereby when the supporting plate is slid outwardly in the guide member the jack may be swung downwardly and slid outwardly in the bearing to a substantially vertical position and may be swung upwardly to a position substantially parallel to the frame when it is slid inwardly in the bearing and the supporting plate is slid inwardly in the guide member, means on the shafts which engage means on the bearings when the shafts are slid outwardly to a limited extent so that rotation of the shafts relative to the bearings is prevented when the shafts are in their outward position relative to the frame and the jack is in its vertical position, means for limiting the sliding movement of the plates in the guide members, and means for extending and retracting the jacks.

2. Means for supporting a body for a truck or trailer, comprising a body frame, guide members secured to the frame and extending substantially parallel to the underside of the frame, supporting plates slidable in the guide members inwardly and outwardly transversely relative to the frame, bearings secured beneath the supporting plates, stub shafts extending inwardly beneath the frame and rotatably mounted in the bearings, a jack secured to the outer end of each stub shaft, whereby the jack may be swung downwardly to a substantially vertical position when its supporting plate is slid outwardly and may be swung upwardly to a position beneath the frame and substantially parallel thereto when its supporting plate is slid inwardly, means for retaining the jacks in upward position beneath the body, cooperating means between said stub shaft and said bearing preventing rotation of the shafts when the jacks are in their outward vertical positions, means for limiting the sliding movement of the plates in the guide members, and means for extending and retracting the jacks.

3. Means for supporting a body for a truck or trailer, as claimed in claim 2, in which the body frame comprises longitudinal members and spaced apart transverse members, and the guide members for the plate are secured to the inside of the transverse members.

4. Means for supporting a body for a truck or trailer as claimed in claim 2, in which the bearings for the stub shaft comprise two rings welded to the underside of the supporting plate adjacent its ends.

References Cited in the file of this patent
UNITED STATES PATENTS

| | | |
|---|---|---|
| 1,290,694 | Angle | Jan. 7, 1919 |
| 1,303,854 | Clark | May 20, 1919 |
| 2,925,930 | Parks | Feb. 23, 1960 |
| 3,073,467 | Parks | Jan. 15, 1963 |